United States Patent
Ahmavaara

(10) Patent No.: US 8,503,460 B2
(45) Date of Patent: Aug. 6, 2013

(54) DYNAMIC HOME NETWORK ASSIGNMENT

(75) Inventor: Kalle Ahmavaara, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 12/409,307

(22) Filed: Mar. 23, 2009

(65) Prior Publication Data

US 2009/0238099 A1 Sep. 24, 2009

Related U.S. Application Data

(60) Provisional application No. 61/038,829, filed on Mar. 24, 2008.

(51) Int. Cl.
*H04L 12/28* (2006.01)
*H04W 4/00* (2009.01)
*G06F 15/16* (2006.01)

(52) U.S. Cl.
USPC ............ 370/401; 370/254; 370/329; 709/228

(58) Field of Classification Search
USPC ............... 370/335–338, 401–466, 223–331; 455/453–455, 411–438; 709/223–238
See application file for complete search history.

(56) References Cited

U.S. PATENT DOCUMENTS

| 7,505,442 | B2 | 3/2009 | Kniveton | |
| 7,660,584 | B2* | 2/2010 | Maxwell et al. | 455/436 |
| 7,839,874 | B2* | 11/2010 | Zhao et al. | 370/401 |
| 7,849,127 | B2* | 12/2010 | Lindem et al. | 709/201 |
| 2003/0217180 | A1 | 11/2003 | Chandra et al. | |
| 2004/0179539 | A1 | 9/2004 | Takeda et al. | |
| 2007/0268919 | A1* | 11/2007 | Sarikaya et al. | 370/401 |
| 2007/0274266 | A1* | 11/2007 | Oyama et al. | 370/335 |
| 2007/0283149 | A1 | 12/2007 | Devarapalli | |
| 2008/0130637 | A1* | 6/2008 | Kant et al. | 370/389 |
| 2008/0192695 | A1* | 8/2008 | Krishnan et al. | 370/331 |
| 2008/0207168 | A1* | 8/2008 | Forsberg | 455/411 |
| 2008/0254768 | A1* | 10/2008 | Faccin | 455/411 |
| 2008/0320149 | A1* | 12/2008 | Faccin | 709/228 |

(Continued)

FOREIGN PATENT DOCUMENTS

| EP | 1460815 A1 | 9/2004 |
| JP | 2004282315 A | 10/2004 |

(Continued)

OTHER PUBLICATIONS

Gundavelli K Leung Cisco V Devarapalli Azaire Networks K Chowdhury Starent Networks B Patil Nokia Siemens Networks S: "Proxy Mobile IPv6; draft-ietf-netlmm-proxymip6-00.txt" Apr. 8, 2007, IETF Standard-Working-Draft, Internet Engineering Task Force, IETF, Ch , XP015049635 ISSN: 0000-0004 the whole document.

(Continued)

*Primary Examiner* — M. Phan
(74) *Attorney, Agent, or Firm* — François A. Pelaez

(57) ABSTRACT

A method for wireless communications is provided. The method includes establishing a connection with a gateway device in a wireless network. This includes receiving a configuration packet from the gateway device that identifies home mobility options. The method processes at least one home network address from the home mobility options. The method also includes receiving or processing a home network prefix from the home mobility options.

48 Claims, 11 Drawing Sheets

U.S. PATENT DOCUMENTS

| | | | |
|---|---|---|---|
| 2009/0016364 A1* | 1/2009 | Krishnan | 370/401 |
| 2009/0043902 A1* | 2/2009 | Faccin | 709/229 |
| 2009/0047947 A1* | 2/2009 | Giaretta et al. | 455/432.1 |
| 2009/0116452 A1* | 5/2009 | Guan | 370/331 |
| 2009/0161624 A1* | 6/2009 | Johnson et al. | 370/331 |
| 2009/0268691 A1* | 10/2009 | Aramaki et al. | 370/332 |
| 2010/0008300 A1* | 1/2010 | Wu et al. | 370/328 |
| 2010/0042714 A1* | 2/2010 | Choi et al. | 709/223 |
| 2010/0199332 A1* | 8/2010 | Bachmann et al. | 726/4 |
| 2010/0202383 A1* | 8/2010 | Sugimoto et al. | 370/329 |
| 2010/0246509 A1* | 9/2010 | Chen | 370/329 |
| 2010/0284331 A1* | 11/2010 | Weniger et al. | 370/328 |

FOREIGN PATENT DOCUMENTS

| | | |
|---|---|---|
| JP | 2008547274 | 12/2008 |
| RU | 2265282 C2 | 11/2005 |
| WO | 02103978 A2 | 12/2002 |
| WO | WO2005099221 | 10/2005 |
| WO | 2006099221 A2 | 9/2006 |

OTHER PUBLICATIONS

International Search Report and Written Opinion—PCT/US2009/038047, International Search Authority—European Patent Office—Jul. 30, 2009.

Taiwan Search Report—TW098109574—TIPO—Mar. 18, 2012.

Technical Specification Group Services and System Aspects: "Architecture enhancements for non-3GPP accesses TS 23.402 V8.0.0 (Release 8)" 3GPP-Standards, 2500 Wilson Boulevard, Suite 300, Arlington, Virginia 22201 USA, Dec. 2007, XP040278698 Chapter 4.1.2; p. 12 Chapters 4.3.2-4.3.5.2; pp. 22-24 Chapters 6.2.1-6.3; pp. 54-62 Chapters 8-9.3.2; pp. 82-104 Annex C.5; pp. 124-125.

Taiwan Search Report—TW098109574—TIPO—Oct. 2, 2012.

\* cited by examiner

DYNAMIC HOME NETWORK ASSIGNMENT

CLAIM OF PRIORITY UNDER 35 U.S.C. §119

This application claims the benefit of U.S. Provisional Patent Application No. 61/038,829, entitled DYNAMIC HOME NETWORK PREFIX ASSIGNMENT, and filed on Mar. 24, 2008, the entirety of which is incorporated herein by reference.

BACKGROUND

I. Field

The following description relates generally to wireless communications systems, and more particularly to dynamic assignment of home link address and prefix designators for networks that employ Mobile Internet Protocol (MIP).

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

Related to such wireless systems includes Mobile Internet Protocol (MIP) applications for exchanging data with wireless user equipment (UE) or devices. One aspect of MIP includes Home Network Prefix (HNP) assignment that is generally based on Internet Key Exchange (IKE) protocol to provide bootstrapping between Mobile Nodes and Home Agents. If a specific access link is desired as the home link for the UE, it may not be desirable to mandate that the mobile node bootstrap via IKE to later find that it is already in the home link and thus causes degradation on performance. One possibility is to statically configure the mobile node which is a rigid and inflexible option. As noted, the other option is to configure via IKE protocol but this option may not provide the best performance solution since various handshaking may be required in order to actually determine a desired home network address. Such solutions may also make it difficult to navigate to other networks and still manage the home network address.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided to dynamically assign addresses and manage home network links in a wireless communications environment. Access specific solutions are provided to dynamically assign home network addresses (HNA) or home network prefixes (HNP) to a Mobile Node (UE) without running Internet Key Exchange IKE bootstrapping between the UE and a gateway device such as packet data network (PDN), Home Agent (HA), or gateway for a General Packet Radio Services Support Node (GGSN), for example. For mobile nodes not configured for dynamic assignment, IKE bootstrapping can also be employed. Such assignments can be based on Mobile Internet Protocols (MIP) such as dual stack MIP (DSMIP) or proxy MIP (PMIP), for example. When a 3GPP access link (EPS bearer or PDP context) is established, it is possible to exchange specific additional information elements between the UE and the gateway by dynamically exchanging protocol configuration options (PCO). For example, a MIP or DSMIP (e.g., version 6) home network prefix could be one of those information elements exchanged within the PCO. The UE can then employ the received home network options (HNO) to detect whether it locates in a respective home link or otherwise (e.g., home link associated with a MIP/DSMIP protocol).

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents.

Other advantages and novel features may become apparent from the following detailed description when considered in conjunction with the drawings.

DETAILED DESCRIPTION

Systems and methods are provided to dynamically generate and manage network addresses for mobile wireless applications. In one aspect, a method for wireless communications is provided. The method employs a processor executing computer executable instructions stored on a computer readable storage medium to implement various acts. The method includes establishing a connection with a gateway device in a wireless network. This includes receiving a configuration packet from the gateway device that identifies home mobility options. The method processes at least one home network address from the home mobility options. This also includes receiving or processing a home network prefix from the home mobility options.

Figure 1:
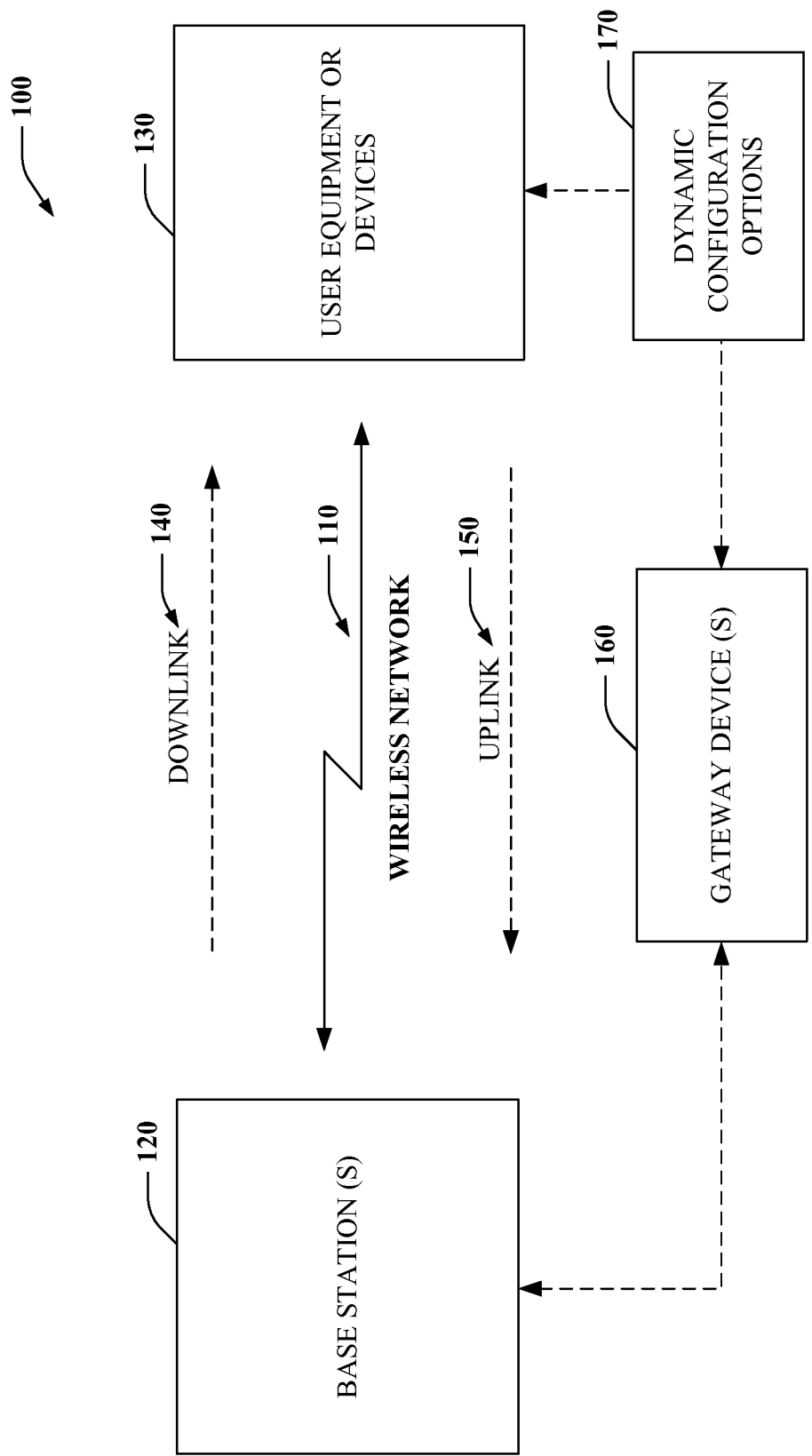
FIG. 1 is a high level block diagram of a system that employs dynamic home link assignments in a wireless communications environment.

Referring now to FIG. 1, dynamic home link assignments are generated for a wireless communications system. The system 100 includes one or more base stations 120 (also referred to as a node, evolved node B-eNB, femto station, pico station, and so forth) which can be an entity capable of communication over a wireless network 110 to a second device 130 (or devices). For instance, each device 130 can be an access terminal (also referred to as terminal, user equipment, mobility management entity (MME) or mobile device). The base station 120 communicates to the device 130 via downlink 140 and receives data via uplink 150. Such designation as uplink and downlink is arbitrary as the device 130 can also transmit data via downlink and receive data via uplink channels. It is noted that although two components 120 and 130 are shown, that more than two components can be employed on the network 110, where such additional components can also be adapted for the wireless protocols described herein. As shown, a gateway device 160 (or devices) is provided to dynamically assign home link information for the user equipment 130. The gateway 160 can provide such assignment information via a dynamic configuration options packet 170. It is noted that the gateway device 160 can be a separate node on the wireless network 110. The gateway device 160 could also be incorporated in one or more other devices. For example, the gateway device could be incorporated in the base station 120 and/or in the user equipment 130.

In one aspect, the system 100 is employed to dynamically assign addresses and manage home network links in a wireless communications environment. Access specific solutions are provided to dynamically assign home network addresses (HNA) or home network prefixes (HNP) via the configuration options 170 to the user equipment 130 without running Internet Key Exchange IKE bootstrapping between the UE and the gateway device 160. The gateway device can include a packet data network (PDN) gateway, a Home Agent (HA), a local mobility agent (LMA), or gateway for a General Packet Radio Services Support Node (GGSN), for example. For mobile devices 130 not configured for dynamic assignment, IKE bootstrapping can also be employed. Such assignments can be based on Mobile Internet Protocols (MIP) such as dual stack MIP (DSMIP) or proxy MIP (PMIP), for example. When a 3GPP access link (EPS bearer or PDP context) is established, it is possible to exchange specific additional information elements between the UE and the gateway by dynamically exchanging protocol configuration options (PCO) 170. For example, a MIP or DSMIP (e.g., version 6) home network prefix could be one of those information elements exchanged within the PCO 170. The UE 130 can then employ the received home network options (HNO) to detect whether it locates in a respective home link or other network link (e.g., home link associated with a MIP/DSMIP protocol).

Figure 2:
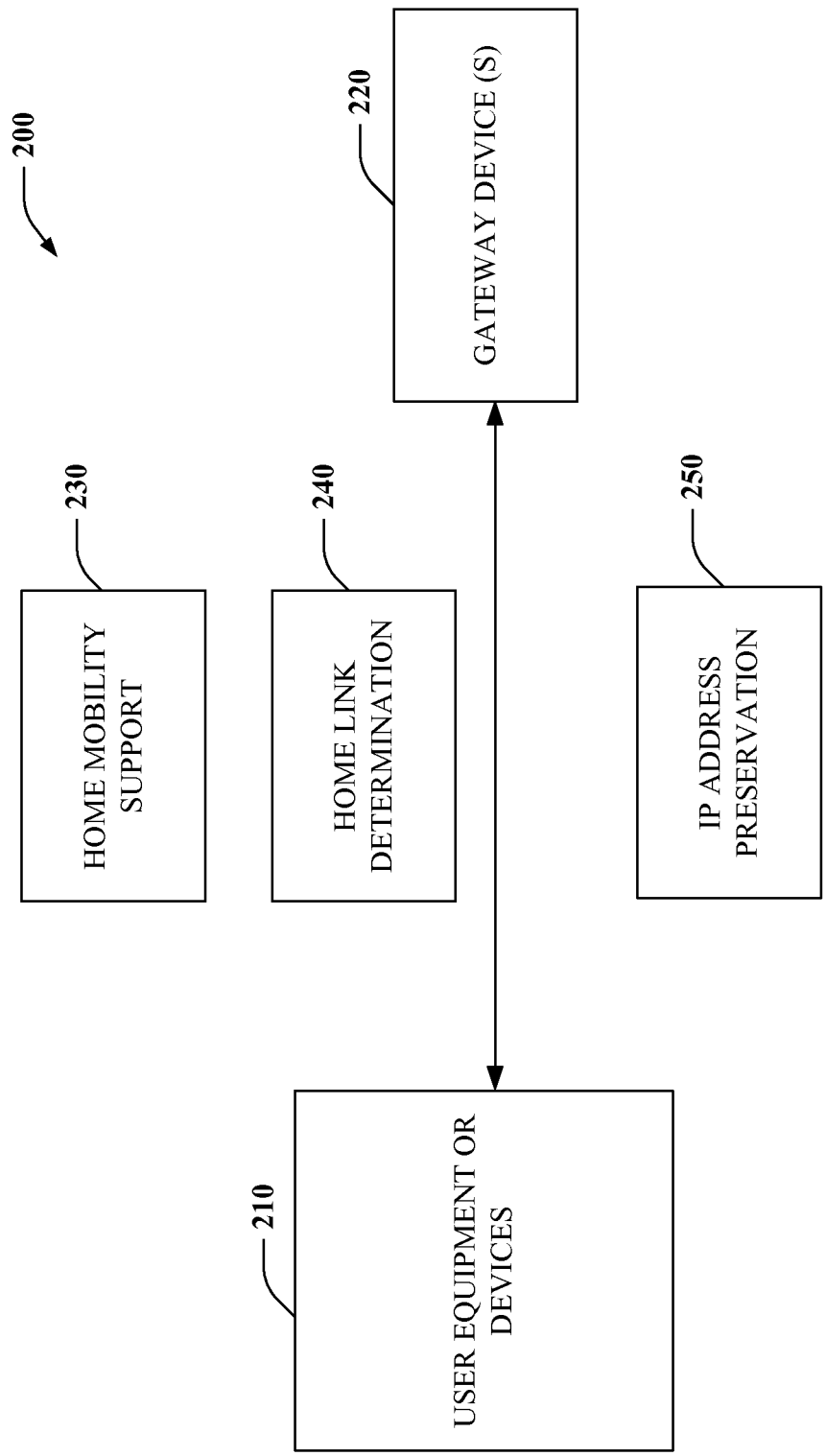
FIG. 2 is a system that illustrates home link assignment capabilities for a wireless system.
Figure 3:
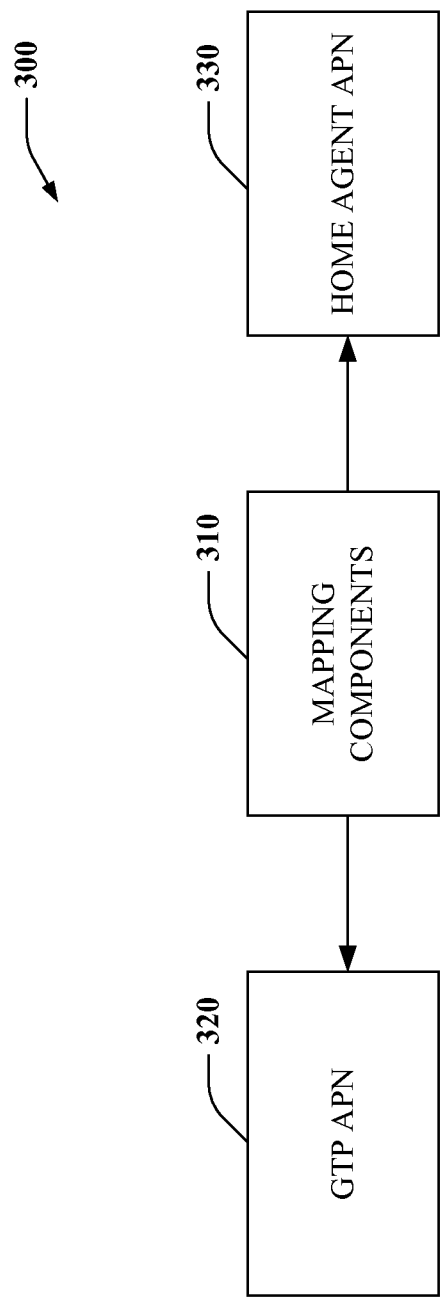
FIG. 3 is a system that illustrates an example mapping between access protocols.
Figure 4:
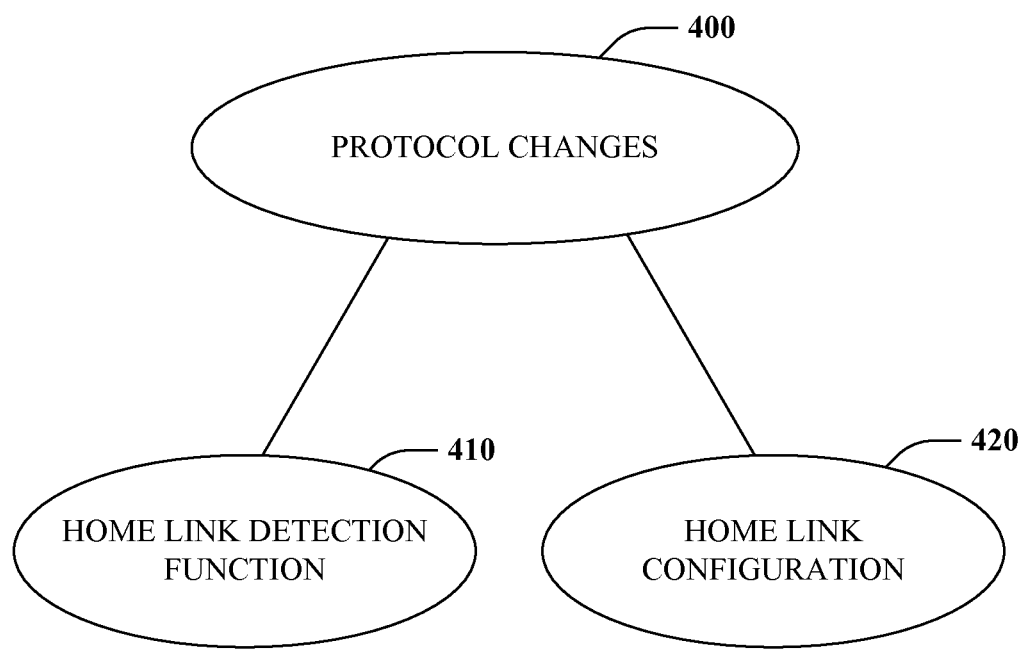
FIG. 4 illustrates protocol changes relating to Architecture Enhancements for non-3GPP accesses.

Before proceeding with a more detailed discussion of the dynamic assignment protocols in FIGS. 2-4, it is noted that several aspects are considered when providing wireless mobility support. Such aspects include the specification TS 23.402/23.401 "Architecture Enhancements for non-3GPP accesses" where the 3GPP access is considered as the home link for DSMIPv6, for example. The claimed subject matter address for example how a DSMIPv6 enabled UE 130 determines whether host-based mobility is supported for a PDN gateway 160. This includes addressing how a DSMIPv6 enabled UE determines that it is in a DSMIPv6 home link and how to facilitate that a DSMIPv6 enabled UE can preserve the IP address when it moves from a home link to a foreign link, for example. Other considerations relate to determining a mapping between a General Packet Radio Services Tunneling Protocol (GTP) access point name (APN) and a home agent access point name (HA-APN) which is described in more detail below. In general, a HA-APN may not always resolve in a domain name service (DNS) into the same IP address. A home agent (HA) function described below and the GTP termination may have different IP addresses within one PDN gateway 160. Generally, not all PDN gateways 160 support Home Agent functions and thus other processing considerations are provided which are described below. Also, host-based mobility may not be provided for all PDN gateways.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Referring now to FIG. 2, a system 200 illustrates home link assignment capabilities for a wireless system. As shown, user equipment or devices 210 communicate with a gateway device (or devices) 220 to receive home link information. At 230, home mobility support is considered. Thus, how does a DSMIPv6 enabled UE 210 determine whether host based mobility is supported for a gateway 220 such as a PDN. If the UE 210 initially connects to the PDN 220 with host based mobility, the successful IKEv2 bootstrap itself tells that host based mobility is supported. If the UE 210 connects with network based mobility, how does it determine whether host based mobility is supported for the respective PDN. In one aspect, if host based mobility is supported for the connected PDN 220, the gateway should deliver the home address (HA) Internet Protocol (IP) address to the UE 210 at PDN connection setup. A protocol configuration option (PCO) can be used to request and deliver collocated HA address at default bearer establishment. From the PCO, an "Integrated UE" understands that it can later bootstrap IKEv2 towards the indicated HA address to re-establish PDN connectivity. A "Non Integrated UE" (or non-adapted) should bootstrap IKEv2 to determine whether host based mobility is supported for this PDN 220.

At 240, home link determinations are considered. In this aspect, how a DSMIPv6 enabled UE 210 determines that it is in a DSMIPv6 home link is considered. To determine whether a link is a DSMIPv6 home link the UE should determine: The advertised IPv6 prefix(es) via the current access link; and the DSMIPv6 Home Network Prefix (HNP). The IPv6 prefix advertisements are known from the access link for 3GPP this is described in TS 23.401 & TS 23.060 specifications. The Home Network Prefix (HNP) could be: statically configured at the UE 210; or dynamically allocated to the UE. The HNP can be dynamically assigned during IKEv2 bootstrapping where a 3GPP specific mechanism can also be defined, if desired. A possible 3GPP specific solution could indicate the HNP to the UE 210 together with the HA address in the PCO. Thus, an "Integrated UE" would not have to bootstrap IKEv2 for home link detection. A "Non Integrated UE" would bootstrap IKEv2 for home link detection.

At 250, IP address preservation is considered. In this aspect, how to facilitate that a DSMIPv6 enabled UE 210 can preserve the IP address when it moves from a home link to a foreign link is considered. In order to preserve the IP address with host based mobility, the UE 210 connects to the Home Agent entity (or gateway) into which the already allocated IP address points to. An "Integrated UE" may perform the home link detection based on information received in the PCO. The PCO information contains the home address IP address. Thus, the UE knows which HA IP address to use over foreign link. The "Non Integrated UE" performs the home link detection based on IKEv2 bootstrapping. For the bootstrapping, the UE has already discovered the HA IP address. Thus, the UE knows which HA IP address to use over foreign link.

Turning to FIG. 3, a system 300 illustrates an example mapping between access protocols. In this example, a mapping component 310 links a general packet radio services tunneling protocol (GTP) access point name (APN) 320 with a home agent (HA) APN 330. The mapping includes predefined automatic mapping between a "GTP APN" and the corresponding "HA APN" where each 3GPP entity can derive substantially all APN types pointing to the same PDN when from one APN. For no predefined mapping between "GTP APN" and "HA APN" then mapping information between APNs can be conveyed in various component interfaces. Various mappings can occur such as: an APN xyz . . . (xyz are positive integers) points to a GTP termination point providing access to PDN abc . . . (abc are positive integers). In another case, HA APN xyz points to a DSMIPv6 termination point (HA function) providing access to PDN abc. In yet another example, a local mobility agent (LMA) APN xyz points to a proxy MIP (PMIPv6) termination point (LMA function) providing access to PDN abc.

Referring to FIG. 4, protocol changes 400 are provided that relate to Architecture Enhancements for non-3GPP accesses. At 410, specification 23.402 provides a Home Link detection function to be based on comparison of current IPv6 prefix and Home Network Prefix. Supported dynamic HNP prefix allocation mechanisms are: IKEv2 bootstrapping and access specific mechanisms e.g., PCO for TS 23.401. At 420, specification 23.401 provides that DSMIPv6 enabled UEs may request DSMIPv6 information at Default Bearer establishment inside the PCO. The DSMIPv6 Home Link enabled gateways deliver DSMIPv6 information back to the UE in the PCO where the home address IP address is generally mandatory and the Home Network Prefix is generally optional.

Figure 5:
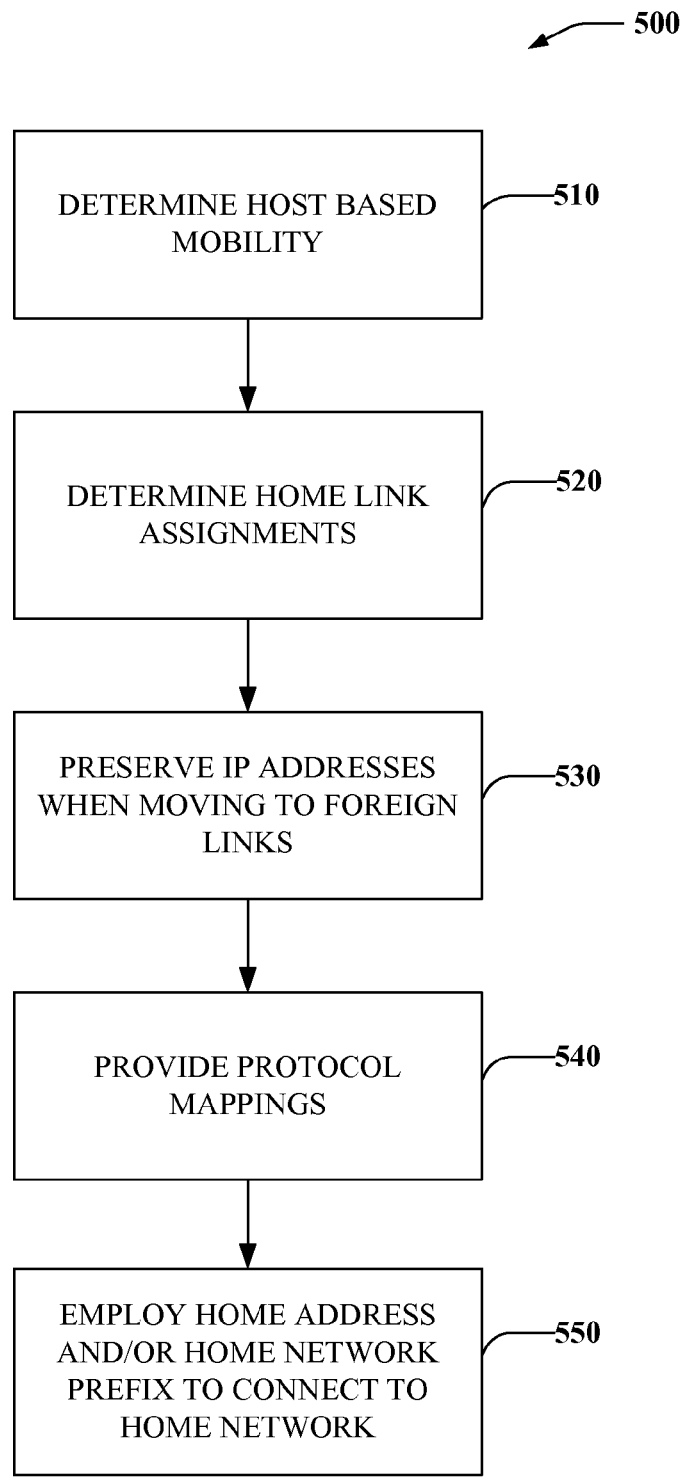
FIG. 5 illustrates a wireless communications method dynamically generates home link assignments.

Referring now to FIG. 5, a wireless communications methodology 500 is illustrated. While, for purposes of simplicity of explanation, the methodology (and other methodologies described herein) are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 510, host based mobility is determined. This includes establishing a connection with a gateway device in a wireless network and receiving a configuration packet from the gateway device that identifies home mobility options. This also includes processing at least one home network address from the home mobility options which can include a home network prefix. The configuration packet can be associated with a protocol configuration option (PCO), and the gateway device can be a packet data network (PDN) gateway, for example. For non-adapted user equipment, bootstrapping can be provided via an Internet Key Exchange (IKE) protocol to determine the home network address.

Proceeding to 520, the method 500 includes decoding a home link address by processing advertised prefixes via a current access link and processing a home network prefix. The home network prefix can be statically configured at user equipment or dynamically allocated to the user equipment. At 530, the method 500 includes preserving an Internet Protocol (IP) address when moving from a home link to a foreign link, for example. This can include connecting to a home agent entity in which a previously allocated IP address indicates. The method also includes receiving the IP address via a protocol configuration option and employing the IP address over the foreign link. At 540, the method 500 includes a mapping between a general packet radio services tunneling protocol (GTP) and a home agent access point name (APN). This can include providing an automatic mapping between the GTP and the home agent by deriving APN types that point to or indicate a packet data network (PDN) gateway device.

The automatic mapping includes enabling at least one APN to indicate a GTP termination point that provides access to at least one PDN gateway device. In another aspect, the automatic mapping enables at least one home agent APN to indicate a dual stack mobile Internet Protocol (DSMIP) termination point that provides access to at least one PDN gateway device. In yet another aspect, the automatic mapping enables at least one local mobility agent APN to indicate a proxy mobile Internet Protocol (PMIP) termination point that provides access to at least one PDN gateway device. For static implementations, information can be mapped between APN's via one or more interfaces. The home network address described above can be associated with a dual stack mobile Internet Protocol (DSMIP) or a proxy mobile Internet Protocol (PMIP), for example. At 550, the home address and/or the home network prefix may be employed to connect to the home network.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
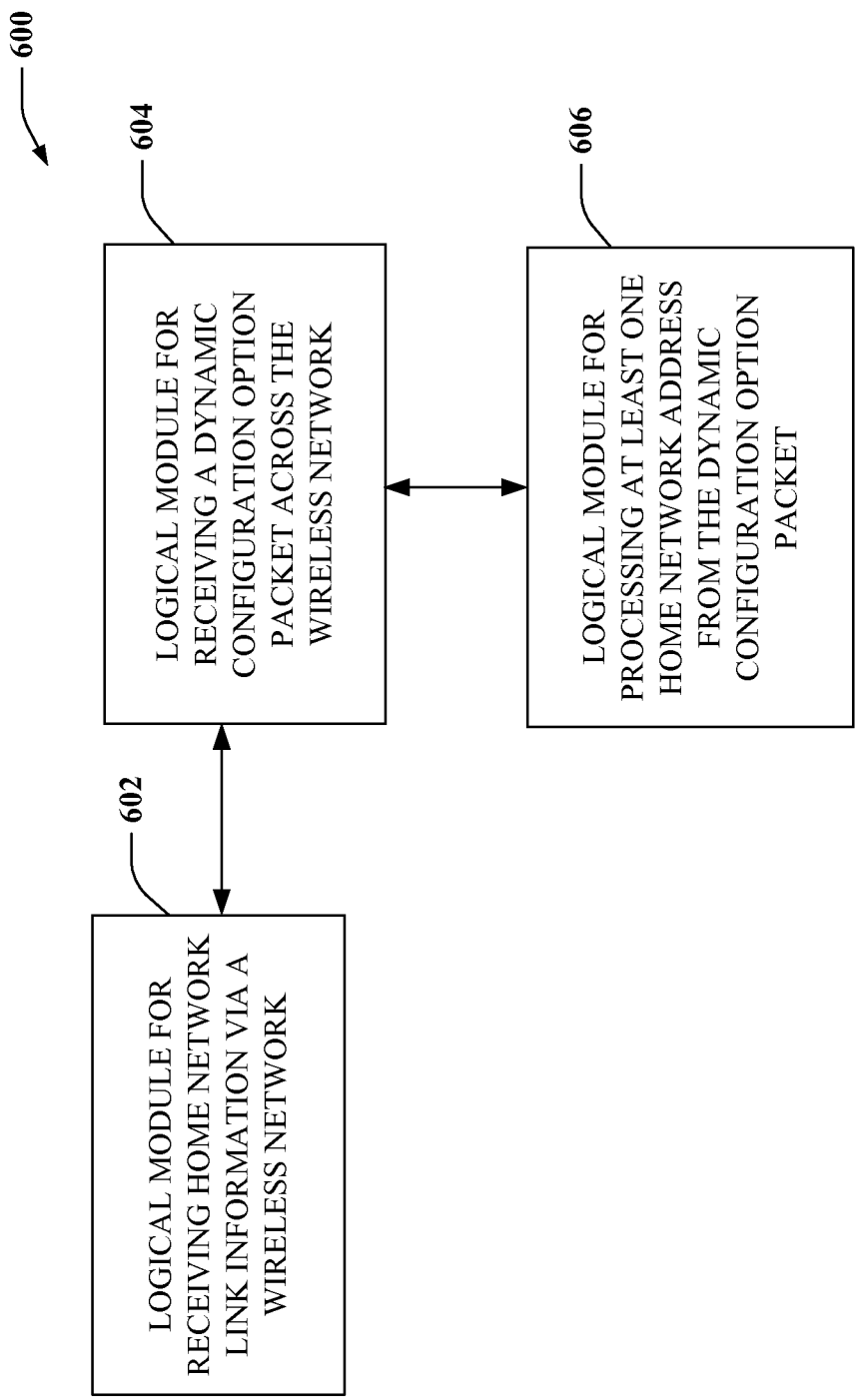
FIG. 6 illustrates an example logical module for a wireless protocol.
Figure 7:
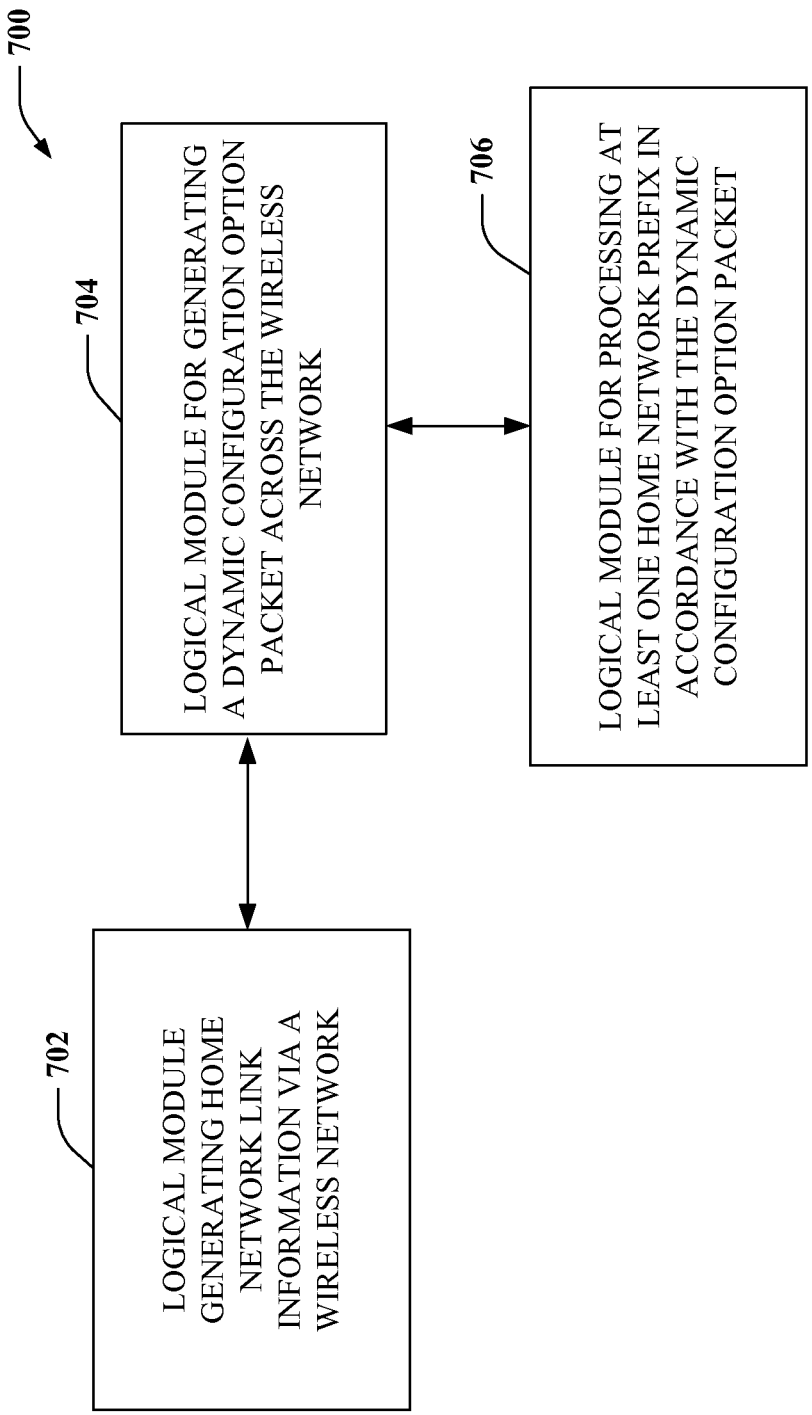
FIG. 7 illustrates an example logical module for an alternative wireless protocol.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 for receiving home network link information via a wireless network. This includes a logical module 604 for receiving a dynamic configuration option packet across the wireless network. The system 600 also includes a logical module 606 for processing at least one home network address from the dynamic configuration option packet.

Referring to FIG. 7, a wireless communication system 700 is provided. The system 700 includes a logical module 702 for generating home network link information via a wireless network. This includes a logical module 704 for generating a dynamic configuration option packet across the wireless network. The system 700 also includes a logical module 706 for processing at least one home network prefix in accordance with the dynamic configuration option packet.

Figure 8:
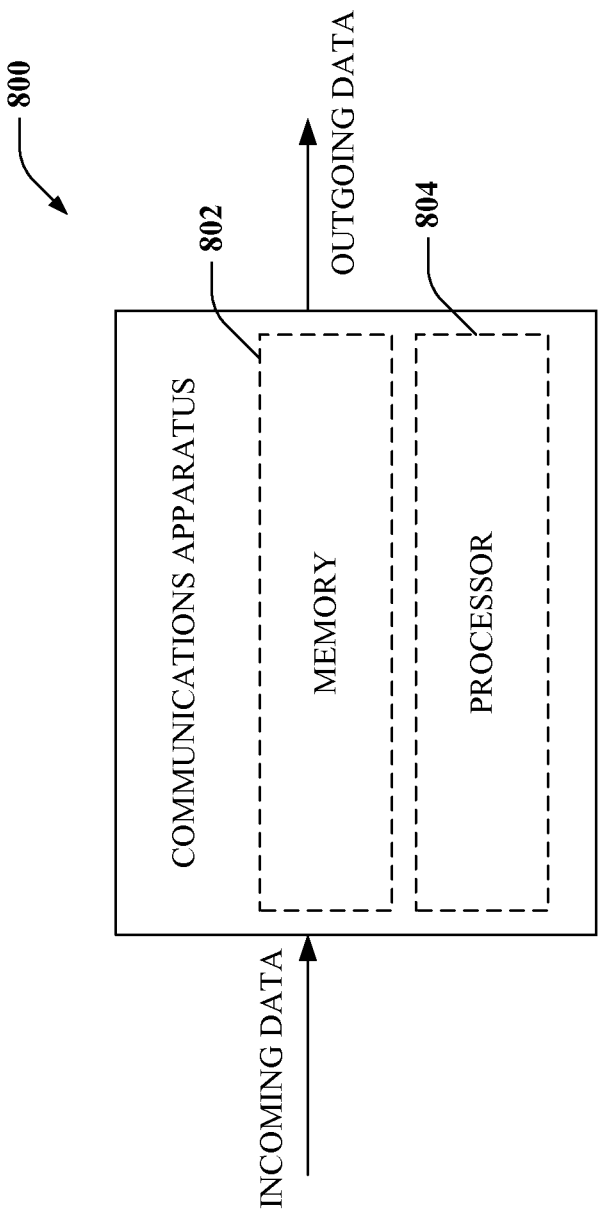
FIG. 8 illustrates an example communications apparatus that employs a wireless protocol.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
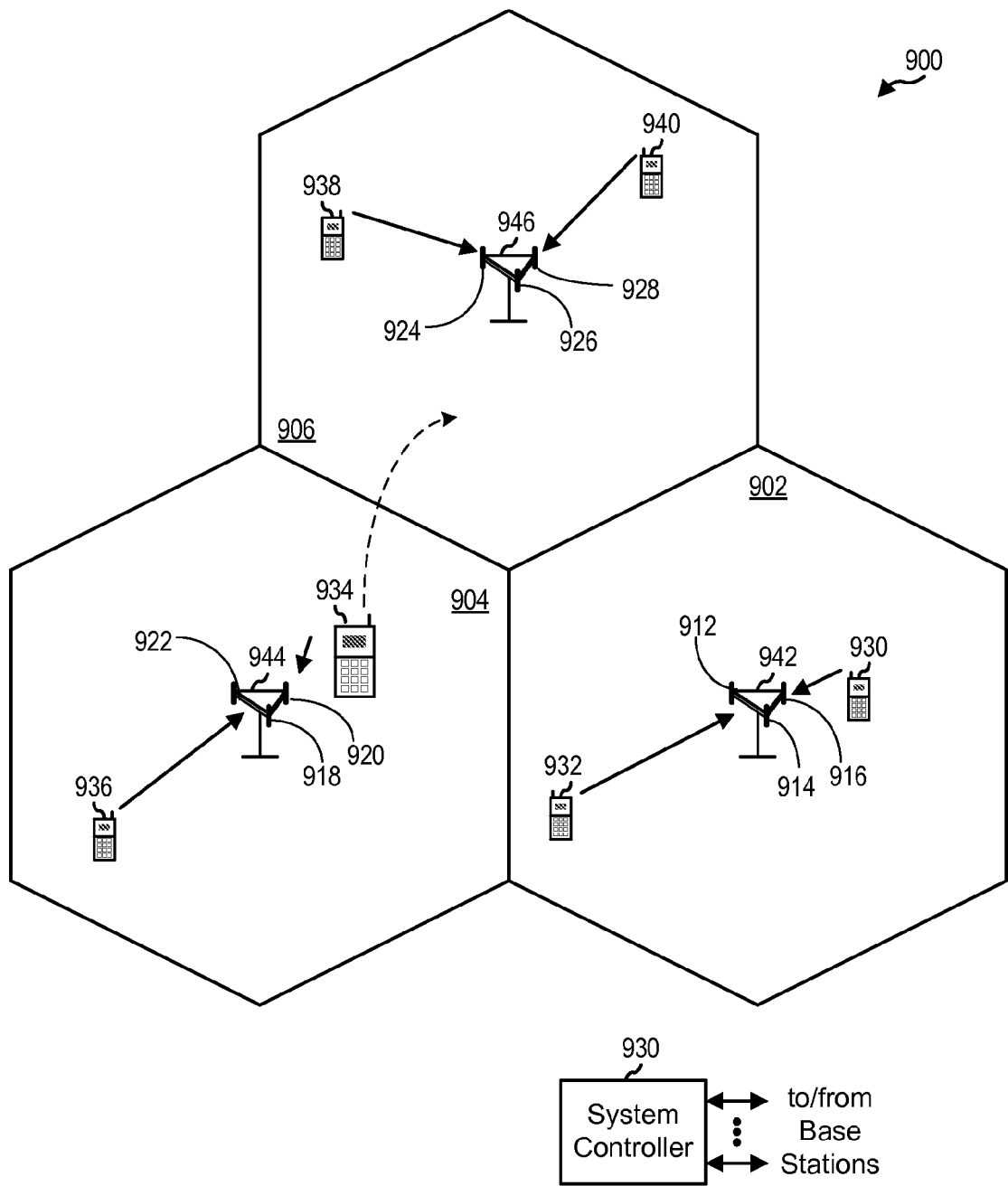
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
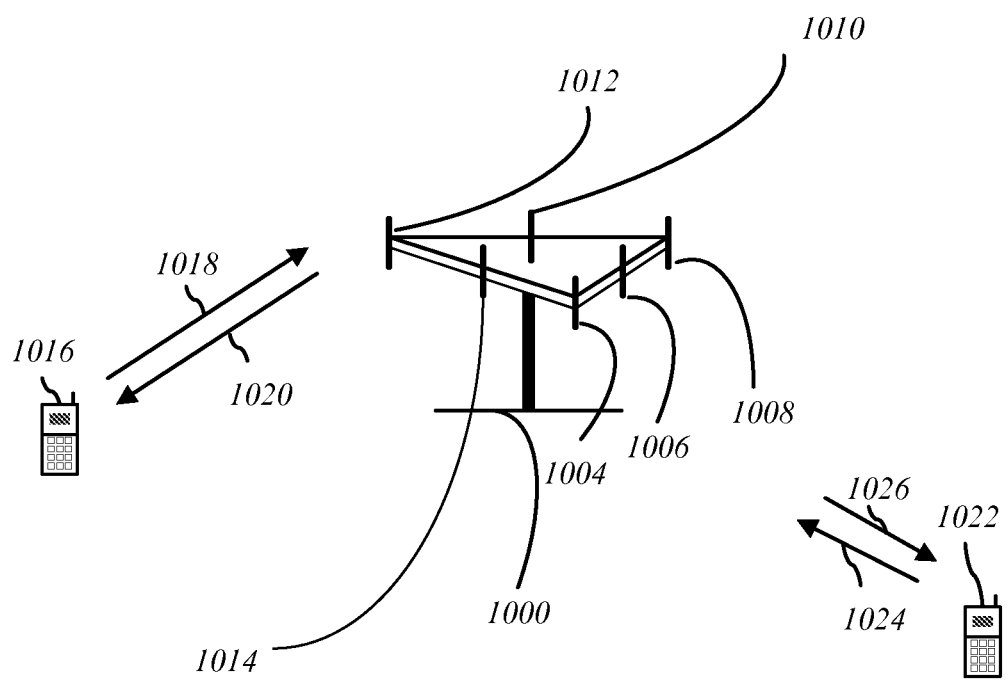
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
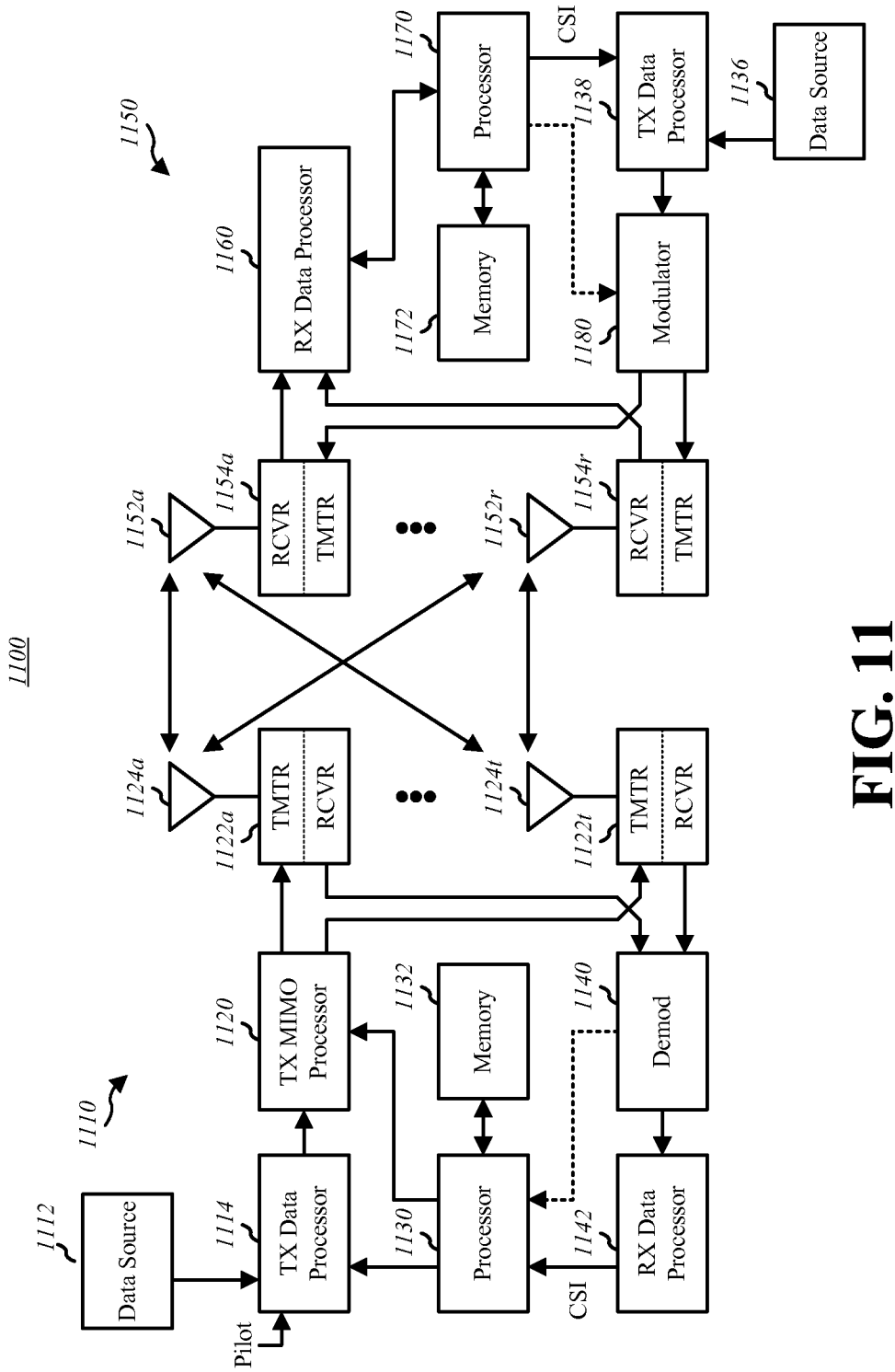

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130. Processor 1130 may communicate with memory 1132.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 may communicate with memory 1172. Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communications, comprising:
employing a processor executing computer executable instructions stored on a computer readable storage medium to implement the following acts:
establishing a connection with a gateway device in a wireless network;
receiving a configuration packet from the gateway device that identifies home mobility options;
processing at least one home network address from the home mobility options;
determining whether the at least one home network address is associated with a dual stack mobile internet protocol based on the home mobility options; and
providing a mapping between a general packet radio services tunneling protocol (GTP) and a home agent access point name (APN).

2. The method of claim 1, further comprising receiving a home network prefix from the home mobility options.

3. The method of claim 1, wherein the configuration packet is associated with a protocol configuration option (PCO).

4. The method of claim 1, wherein the gateway device is a packet data network (PDN) gateway.

5. The method of claim 1, further comprising bootstrapping via an Internet Key Exchange (IKE) protocol to determine the home network address.

6. The method of claim 1, further comprising decoding a home link address by processing advertised prefixes via a current access link and processing a home network prefix.

7. The method of claim 6, wherein the home network prefix is statically configured at a user equipment or dynamically allocated to the user equipment.

8. The method of claim 1, further comprising preserving an Internet Protocol (IP) address when moving from a home link to a foreign link.

9. The method of claim 8, further comprising connecting to a home agent entity which a previously allocated IP address indicates.

10. The method of claim 9, further comprising receiving the IP address via a protocol configuration option and employing the IP address over the foreign link.

11. The method of claim 1, further comprising providing an automatic mapping between the GTP and the home agent by deriving APN types that point to a packet data network (PDN) gateway device.

12. The method of claim 11, the automatic mapping further comprising enabling at least one APN to indicate a GTP termination point that provides access to at least one PDN gateway device.

13. The method of claim 11, the automatic mapping further comprising enabling at least one home agent APN to indicate a dual stack mobile internet protocol termination point that provides access to at least one PDN gateway device.

14. The method of claim 11, the automatic mapping further comprising enabling at least one local mobility agent APN to indicate a proxy mobile Internet Protocol (PMIP) termination point that provides access to at least one PDN gateway device.

15. The method of claim 1, further comprising mapping information between APN's via one or more interfaces.

16. The method of claim 1, wherein the home network address is associated with the dual stack mobile internet protocol or a proxy mobile Internet Protocol (PMIP).

17. A communications apparatus, comprising:
a memory that retains instructions for establishing a link between at least one wireless device and at least one gateway device, receiving dynamic assignments via the gateway device, receiving a home network prefix via the assignments, determining whether the home network prefix is associated with a dual stack mobile internet protocol based on the dynamic assignments, and providing a mapping between a general packet radio services tunneling protocol (GTP) and a home agent access point name (APN); and
a processor that executes the instructions.

18. The apparatus of claim 17, further comprising receiving a home network address via the assignments.

19. The apparatus of claim 17, wherein the gateway device is a packet data network gateway.

20. The apparatus of claim 17, further comprising employing an Internet Key Exchange protocol to configure non-adapted devices.

21. The apparatus of claim 17, wherein the home network prefix is statically configured at a user equipment or dynamically allocated to the user equipment.

22. The apparatus of claim 17, further comprising a component to preserve an Internet Protocol (IP) address when moving from a home link to a foreign link.

23. A communications apparatus, comprising:
means for receiving home network link information via a wireless network;
means for receiving a dynamic configuration option packet across the wireless network;
means for processing at least one home network address from the dynamic configuration option packet;
means for determining whether the at least one home network address is associated with a dual stack mobile internet protocol based on the dynamic configuration option packet; and
means for providing a mapping between a general packet radio services tunneling protocol (GTP) and a home agent access point name (APN).

24. The apparatus of claim 23, wherein the dynamic configuration option packet includes a home network prefix.

25. A non-transitory computer-readable medium comprising instructions executable to:
receive a configuration option packet across a wireless network;
receive a home network address (HNA) via the configuration option packet;
receive a home network prefix (HNP) via the configuration option packet, where the HNA or the HNP is employed to establish a home network connection;
determine whether the HNA is associated with a dual stack mobile internet protocol based on the configuration option packet; and
provide a mapping between a general packet radio services tunneling protocol (GTP) and a home agent access point name (APN).

26. The non-transitory computer-readable medium of claim 25, wherein the HNA or the HNP is associated with the dual stack mobile internet protocol or a proxy mobile Internet Protocol (PMIP).

27. The non-transitory computer-readable medium of claim 25, wherein the configuration option packet is received from a network gateway device.

28. An apparatus comprising:
a processor that executes instructions stored in memory, the instructions being executable to:
receive a dynamic network assignment across a wireless network;
process a home network address (HNA) via the dynamic assignment;

process a home network prefix (HNP) via the dynamic assignment, where the HNA or the HNP is employed to establish at least one home network connection;

determine whether the HNA is associated with a dual stack mobile internet protocol based on the dynamic assignment; and provide a mapping between a general packet radio services tunneling protocol (GTP) and a home agent access point name (APN).

29. The apparatus of claim 28, wherein the dynamic network assignment is associated with a component to move network assignments from a home link to a foreign link.

30. The apparatus of claim 28, further comprising a component to map protocols between at least two gateway components.

31. A method for wireless communications, comprising:
employing a processor executing computer executable instructions stored on a computer readable storage medium to implement the following acts:
establishing a connection with a wireless device in a wireless network;
generating a configuration packet that identifies home mobility options;
generating at least one home network prefix in accordance with the home mobility options;
determining whether the at least one home network prefix is associated with a dual stack mobile internet protocol based on the home mobility options; and
providing a mapping between a general packet radio services tunneling protocol (GTP) and a home agent access point name (APN).

32. The method of claim 31, further comprising generating a home network address in accordance with the home mobility options.

33. The method of claim 31, further comprising utilizing a packet data network (PDN) gateway to generate the configuration packet.

34. The method of claim 31, further comprising bootstrapping via an Internet Key Exchange (IKE) protocol.

35. The method of claim 31, further comprising encoding a home link address by processing advertised prefixes via a current access link and processing a home network prefix.

36. The method of claim 35, wherein the home network prefix is statically configured at a user equipment or dynamically allocated to the user equipment.

37. The method of claim 31, further comprising preserving an Internet Protocol (IP) address when moving from a home link to a foreign link.

38. A communications apparatus, comprising:
a memory that retains instructions for establishing a link between at least one wireless device and at least one gateway device, generating dynamic assignments via the gateway device, generating a home network prefix via the assignments, determining whether the home network prefix is associated with a dual stack mobile internet protocol based on the dynamic assignments, and providing a mapping between a general packet radio services tunneling protocol (GTP) and a home agent access point name (APN); and
a processor that executes the instructions.

39. The apparatus of claim 38, further comprising generating a home network address via the assignments.

40. The apparatus of claim 38, further comprising employing an Internet Key Exchange protocol to configure non-adapted devices.

41. The apparatus of claim 38, wherein the home network prefix is statically configured at a user equipment or dynamically allocated to the user equipment.

42. The apparatus of claim 38, further comprising a component to preserve an Internet Protocol (IP) address when moving from a home link to a foreign link.

43. A communications apparatus, comprising:
means for generating home network link information via a wireless network;
means for generating a dynamic configuration option packet across the wireless network;
means for processing at least one home network prefix in accordance with the dynamic configuration option packet;
means for determining whether the at least one home network prefix is associated with a dual stack mobile internet protocol based on the dynamic configuration option packet; and
means for providing a mapping between a general packet radio services tunneling protocol (GTP) and a home agent access point name (APN).

44. The apparatus of claim 43, wherein the dynamic configuration option packet includes a home network address.

45. A non-transitory computer-readable medium comprising instructions executable to:
generate a configuration option packet across a wireless network;
generate a home network address (HNA) via the configuration option packet;
process a home network prefix (HNP) via the configuration option packet, where the HNA or the HNP is employed to establish a home network connection;
determine whether the HNA is associated with a dual stack mobile internet protocol based on the configuration option packet; and
provide a mapping between a general packet radio services tunneling protocol (GTP) and a home agent access point name (APN).

46. The non-transitory computer-readable medium of claim 45, wherein the HNA or the HNP is associated with the dual stack mobile internet protocol or a proxy mobile Internet Protocol (PMIP).

47. An apparatus comprising:
a processor that executes instructions stored in memory, the instructions being executable to:
generate a dynamic network assignment across a wireless network;
process a home network address (HNA) via the dynamic assignment;
generate a home network prefix (HNP) via the dynamic assignment, where the HNA or the HNP is employed to establish at least one home network connection;
determine whether the HNA is associated with a dual stack mobile internet protocol based on the dynamic assignment; and
provide a mapping between a general packet radio services tunneling protocol (GTP) and a home agent access point name (APN).

48. The apparatus of claim 47, wherein the dynamic network assignment is associated with a component to move network assignments from a home link to a foreign link.

* * * * *